Patented Nov. 3, 1953

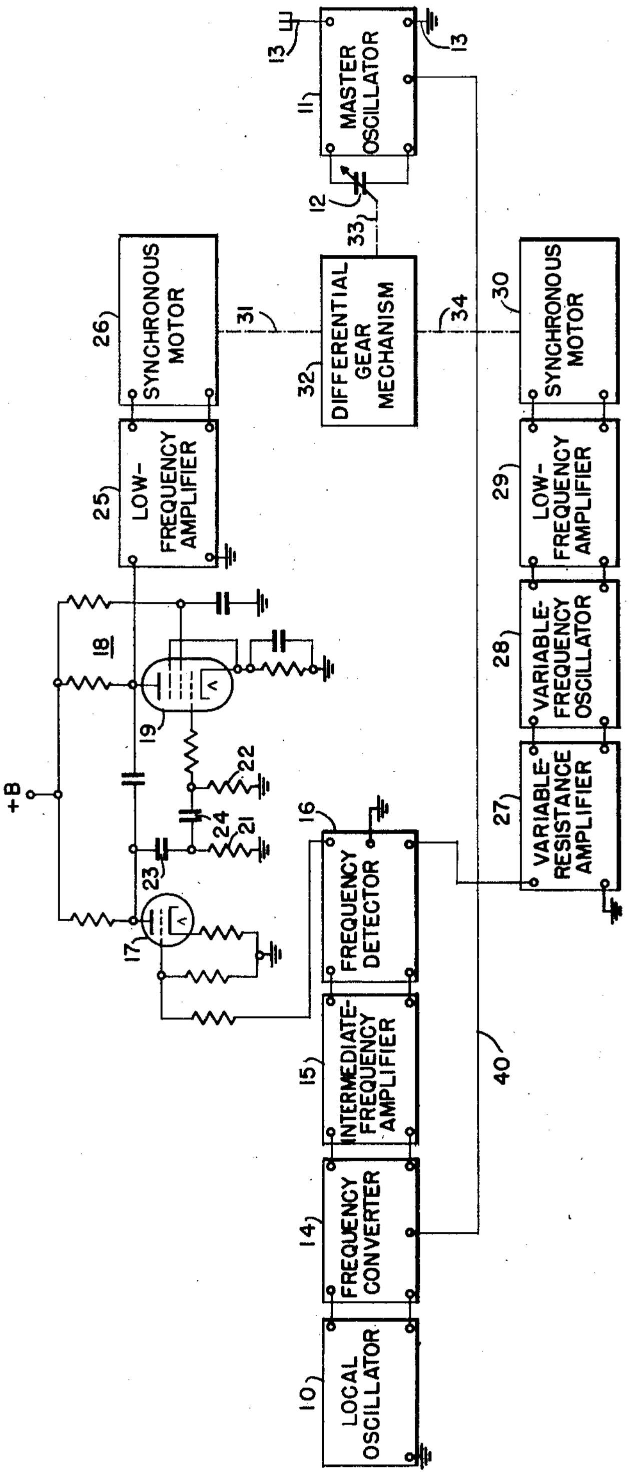
*INVENTOR.*
PATRICK JOHN JACKSON
*BY* Laurence B. Dodds
ATTORNEY

2,658,146

UNITED STATES PATENT OFFICE 2,658,146

SERVO SYSTEM

Patrick John Jackson, Wembley, England, assignor to Hazeltine Research, Inc., Chicago, Ill., a corporation of Illinois Application May 10, 1950, Serial No. 161,117

Claims priority, application Great Britain May 26, 1949

1 Claim. (Cl. 250—36)

GENERAL

The present invention relates to servo systems and particularly to servo systems of the type which utilize a synchronous motor for driving the tuning element of a tunable oscillator automatically to control the frequency of the output signal thereof. The system is particularly suited for use in distance-measuring equipment and accordingly will be described in that environment.

Heretofore, servo systems adapted for use for automatic frequency control of a tunable oscillator have generally utilized a single motor as the driving means for the tuning element of the oscillator. In such systems, the motor ordinarily rotates only when it is necessary to retune the oscillator. Consequently, the initial inertia of the system generally may cause an undesirable time delay in effecting the retuning. Also, when tuning the oscillator, the motor tends to overrun. Reversal of rotation of the motor may therefore be necessary, thus causing the system to "hunt" for the desired frequency. Furthermore, due to the frequent interrupted rotation of the motor in prior such systems, undesirable jamming of the moving elements sometimes occurs. Accordingly, such systems have not been entirely satisfactory for some applications.

It is an object of the present invention, therefore, to provide a new and improved servo system which avoids one or more of the above-mentioned disadvantages of prior such systems.

It is another object of the invention to provide a new and improved servo system which is effective with only a slight time delay to adjust the output signal of a tunable oscillator to a desired frequency.

It is a further object of the invention to provide a relatively simple servo system which has a reduced tendency to hunt and which is adapted for use in distance-measuring equipment automatically to control the frequency of the output signal thereof.

In accordance with a particular form of the invention, a servo system for distance measuring equipment comprises a crystal-controlled oscillator for supplying a first signal having a substantially constant frequency and a tunable oscillator for supplying a second signal including a frequency-adjusting device. The servo system includes a pair of continuously rotatable synchronous motors and a differential gear mechanism for differentially connecting the pair of synchronous motors to the aforesaid adjusting device to control the frequency of the second signal. The servo system also includes a pair of variable-frequency oscillators including a pair of frequency-determining networks and coupled to the energizing circuits of the pair of synchronous motors for providing a pair of output signals to energize the pair of synchronous motors. The servo system additionally includes a frequency converter coupled to the crystal-controlled oscillator and the tunable oscillator for heterodyning the first and second signals to provide a signal having a frequency equal to the frequency difference between the first and second signals and a frequency detector coupled to the frequency converter and the pair of variable-frequency oscillators for deriving a control effect from the difference-frequency signal. The servo system also includes a pair of variable-resistance amplifiers coupled between the frequency detector and the pair of frequency-determining networks for utilizing the aforesaid control effect to cause the pair of variable-frequency oscillators so to control the frequencies of the output signals thereof as to determine the rotational speeds of the synchronous motors and thereby provide a predetermined frequency difference between the first and second signals including a frequency-adjusting device. The system further includes means responsive to the aforesaid signal for deriving a control effect varying with frequency variations of the above-mentioned signal from a predetermined frequency. The system also includes a pair of driving devices and circuit means for energizing the pair of driving devices. The above-mentioned circuit means includes at least one signal source responsive to the aforesaid control effect for energizing one of the driving devices. The servo system further includes a differential mechanism connecting the driving devices to the frequency-adjusting device to control the frequency of the aforesaid signal.

For a better understanding of the present invention, together with other and further objects thereof, reference is had to the following description taken in connection with the accompanying drawing, and its scope will be pointed out in the appended claim.

DESCRIPTION OF SERVO SYSTEM

Referring now to the drawing, the figure is a circuit diagram, partly schematic, of a complete transmitter system for a distance-measuring equipment, which transmitter system embodies the present invention in a particular form. The servo system thereof comprises a means for supplying a first signal, namely a local oscillator 10 which is preferably crystal-controlled. Ordinarily one of several crystals included in the oscillator 10 may be selected to determine the output signal frequency thereof. The local oscillator 10 also may include one or more suitable stages of frequency multiplication to provide in the output circuit thereof a first signal preferably having a substantially constant frequency.

The servo system further comprises means including a tunable master oscillator 11 for supplying in the output circuit thereof a second signal. The master oscillator 11 includes means, represented diagrammatically as a rotatably adjustable condenser 12, for adjusting the frequency of the second signal. Although the adjusting means is represented for simplicity as the condenser 12, it may comprise any one of a number of conventional tuning elements adapted to tune the oscillator 11 throughout the operating frequency range thereof. Ordinarily the frequency of the second signal of the master oscillator 11 is different from the frequency of the first signal from the local oscillator 10. The tunable master oscillator 11 also may include conventional means for pulse-modulating the output signal thereof. The output circuit of the oscillator 11 is coupled to a conventional antenna system 13, 13 and also is coupled by a conductor 40 to the input circuit of a frequency converter 14.

The frequency converter 14 is preferably a crystal mixer in which an input circuit thereof is also coupled to the local oscillator 10. The output circuit of the frequency converter 14 is coupled to a conventional intermediate-frequency amplifier 15 for supplying thereto an intermediate-frequency signal having a frequency equal to the frequency difference between the above-mentioned first and second signals.

The intermediate-frequency amplifier 15 is coupled to a frequency detector 16 which is preferably of the well-known balanced frequency discriminator type. The frequency detector 16 has its output terminals balanced with reference to ground for deriving a control effect from the intermediate- or difference-frequency signal which is applied thereto by the intermediate-frequency amplifier 15.

The output circuit of the frequency detector 16 is coupled to a conventional variable-frequency oscillator 18 which comprises an oscillator tube 19 and a variable-resistance amplifier including a tube 17. The oscillator 18 is of the resistor-condenser type and to this end also includes a frequency-determining network comprising resistors 21 and 22 and condensers 23 and 24 for causing the output signal of the oscillator 18 to have a frequency which is ordinarily low with relation to the frequencies of the above-mentioned first and second signals. The oscillator 18 is energized from a suitable space-current source +B which is preferably of the regulated type. The input and output circuits of the amplifier 17 are conventional and the output circuit thereof is coupled to the frequency-determining network 21, 22, 23, 24 for utilizing the derived control effect in the variable-frequency oscillator 18 to control the frequency of the output signal thereof. The output circuit of the oscillator 18 is coupled to a conventional low-frequency amplifier 25 of one or more stages which is in turn coupled to the energizing circuit of a driving means comprising preferably a continuously rotatable synchronous motor 26.

An output circuit of the frequency detector 16 is also coupled to a variable-frequency oscillator 28 through a variable-resistance amplifier 27. The oscillator 28 and the amplifier 27 are preferably similar to the oscillator 18 and the amplifier 17, respectively. The output circuit of the oscillator 28 is coupled through a low-frequency amplifier 29 to a synchronous motor 30, both of the latter being similar to the corresponding units 25 and 26, respectively, in the other branch. Hence, the means for energizing the pair of synchronous motors 26 and 30 comprise the pair of variable-frequency oscillators 18 and 28 which provide a pair of output signals for energizing those motors.

From the foregoing description it may be seen that a means is coupled to the local oscillator 10, the tunable master oscillator 11, and the variable-frequency oscillators 18 and 28 for deriving a control effect related to a frequency variation of one of the above-mentioned first and second signals with reference to the other thereof. This means includes the frequency converter 14, the intermediate-frequency amplifier 15, and the frequency detector 16.

The shafts of the motors 26 and 30 are mechanically connected to a differential gear mechanism 32 as represented by the dot-dash lines 31 and 34, respectively. The differential gear mechanism 32 also is mechanically connected to the rotor of condenser 12 as represented by the dot-dash line 33. The mechanism 32 thereby differentially connects the motors 26 and 30 to the condenser 12 to control the frequency of the second signal mentioned above.

OPERATION OF SERVO SYSTEM

Considering now the operation of the servo system just described, it will be clear that the local oscillator 10 determines the frequency of the first signal applied to the frequency converter 14. Assume for the moment that the master oscillator 11 supplies to the frequency converter 14 a second signal having a desired frequency higher than the frequency of the first signal applied thereto. The first and second signals applied to the converter are heterodyned therein to provide in the output circuit of the unit 14 a desired difference-frequency output signal within the operating frequency range of the intermediate-frequency amplifier 15. This output signal is applied to the amplifier 15 where it is amplified and applied to the frequency detector 16. Preferably, the frequency of this difference-frequency signal is substantially the center frequency of the frequency detector 16. Accordingly, the frequency detector 16 develops substantially the same potential at each of the output terminals thereof and at each of the control electrodes of the variable-resistance amplifiers 17 and 27.

With the control electrodes of the variable-resistance amplifiers 17 and 27 at substantially the same potential the variable-frequency oscillators 18 and 28 may be initially adjusted to resonate at the same frequency by suitable selection of circuit components. The output signals of the oscillators 18 and 28 are applied to the low-frequency amplifiers 25 and 29, respectively, are amplified therein and then supplied to the energizing circuits of the synchronous motors 26 and 30, respectively. Accordingly, these output signals cause the synchronous motors 26 and 30 continuously to rotate at the same speed. Hence, while the motors continuously rotate at the same speed, the differential connection of each thereof to the rotor of the condenser 12 provided by the differential gear mechanism 32 causes the rotor of the condenser 12 to remain stationary. Thus, during this mode of operation the tuning of the condenser 12 is unchanged and an output signal having a desired frequency is applied to the antenna 13 by the master oscillator 11.

Assuming now that it is desired to change the operating frequency of the master oscillator 11 to a lower frequency, this change may be accomplished through the operation of the servo system by selecting a suitable crystal for the local oscillator 10. The selection of a crystal having a frequency lower than the above-mentioned crystal causes a first signal having a frequency lower than the frequency of the first signal mentioned above to be applied to the frequency converter 14 by the local oscillator 10. Accordingly, the first and second signals applied to the frequency converter 14 by units 10 and 11 beat together and provide a difference-frequency signal having a frequency higher than the frequency of the difference-frequency signal mentioned above. This difference-frequency signal is amplified by the intermediate-frequency amplifier 15 and thence applied to the frequency detector 16 which derives therefrom in its output circuit a control effect related to the frequency variation of the first signal with reference to the second signal. This control effect provides a change in a predetermined sense in the potential applied by the frequency detector 16 to the control electrode of the variable-resistance amplifier 17 and causes a change in the opposite sense in the potential applied to the control electrode of the variable-resistance amplifier 27. Consequently, the values of resistance of the amplifiers 17 and 27 change in opposite senses with relation to the initial values thereof. The frequencies of the output signals of the oscillators 18 and 28 change accordingly, one decreasing and the other increasing. After amplification by amplifiers 25 and 29, respectively, these signals are applied to the energizing circuits of the synchronous motors 26 and 30 and cause the rotational speed of one of the motors to increase and the speed of the other motor to decrease. Thus the frequency converter 14, the intermediate-frequency amplifier 15 and the frequency detector 16 apply the derived control effect to the variable-frequency oscillators 18 and 28 to control the frequencies of the output signals thereof and to determine the rotational speeds of at least one of the pair of motors 26 and 30.

Accordingly, the motors 26 and 30 cause movement of the rotor of the condenser 12 in a predetermined direction through the action of the differential gear mechanism 32. The rotor of the condenser 12 is thereby so rotated that the oscillator 11 is tuned to a lower frequency. When the rotor of the condenser 12 has been sufficiently displaced to tune the oscillator 11 to the desired lower frequency, the mode of operation is as previously described, namely the synchronous motors 26 and 30 then continuously rotate at the same speeds and the rotor of the condenser 12 remains motionless. Since the motors continuously rotate there is very little inertia in the servo system and accordingly, there is little time delay in the response of the system to changes in the control effect. Thus the system has little tendency to overrun and cause "hunting."

A similar mode of operation occurs when a crystal having a resonant frequency higher than that of the first crystal is selected for the local oscillator 10. The control effect then derived by the frequency converter 14, the intermediate-frequency amplifier 15 and the frequency detector 16 is applied to the variable-frequency oscillators 18 and 28 so to control the synchronous motors 26 and 30 as to provide a predetermined frequency difference between the first and second signals and thereby tune the oscillator 11 to a desired higher frequency. During this mode of operation the motors 26 and 30 continue to rotate in the same directions as previously, but the speed of one of the motors now decreases and the speed of the aforesaid other motor increases. Consequently the motors 26 and 30 cause movement of the rotor of the condenser 12 in a direction opposite to the above-mentioned predetermined direction and the oscillator 11 is thereby tuned to the desired higher frequency.

Further, it may be seen that if the frequency of the output signal of the oscillator 11 varies from a predetermined or desired operating frequency due to variations in operating conditions, the servo system is effective similarly to retune that oscillator to substantially the predetermined operating frequency.

Under such operating conditions, means including the local oscillator 10, the frequency converter 14, the intermediate-frequency amplifier 15, and the frequency detector 16 derives a control effect related to the frequency variation of the output signal of the master oscillator 11 and applies that control effect to the oscillators 18 and 28 so to control the synchronous motors 26 and 30 as to maintain the output signal of the master oscillator 11 at substantially the above-mentioned predetermined frequency.

From the foregoing description of the invention, it will be apparent that a servo system embodying the invention has the advantage that two continuously rotatable synchronous motors respond with only slight time delay to a control effect derived from the output signal of the master oscillator automatically to tune that oscillator to a desired frequency.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

A servo system for distance measuring equipment comprising: a crystal-controlled oscillator for supplying a first signal having a substantially constant frequency; a tunable oscillator for supplying a second signal including a frequency-adjusting device; a pair of continuously rotatable synchronous motors; a differential gear mechanism for differentially connecting said pair of synchronous motors to said adjusting device to control the frequency of said second signal; a pair of variable-frequency oscillators including a pair of frequency-determining networks and coupled to the energizing circuits of said pair of synchronous motors for providing a pair of output signals to energize said pair of synchronous motors; a frequency converter coupled to said crystal-controlled oscillator and said tunable oscillator for heterodyning said first and second signals to provide a signal having a frequency equal to the frequency difference between said first and second signals; a frequency detector coupled to said frequency converter and said pair of variable-frequency oscillators for deriving a control effect from said difference-frequency signal; and a pair of variable-resistance amplifiers coupled between said frequency detector and said pair of frequency-determining networks for utilizing said control effect to cause said pair of variable-frequency oscillators so to control the frequencies of said output signals thereof as to determine the rotational speeds of said synchronous motors and thereby provide a predetermined frequency difference between said first and second signals.

PATRICK JOHN JACKSON.

References Cited in the file of this patent

UNITED STATES PATENTS

| Number | Name | Date |
|---|---|---|
| 1,907,132 | Thurston | May 2, 1933 |
| 1,931,873 | Marrison | Oct. 24, 1933 |
| 2,173,902 | Gerth et al. | Sept. 26, 1939 |
| 2,562,943 | Pensyl | Aug. 7, 1951 |